(12) United States Patent
Grozinger et al.

(10) Patent No.: US 9,450,399 B2
(45) Date of Patent: Sep. 20, 2016

(54) ELECTRICAL OR ELECTRONIC SAFETY CIRCUIT

(75) Inventors: Roland Grozinger, Heitersheim (DE); Detlef Ramin, Hausen (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 295 days.

(21) Appl. No.: 13/822,093

(22) PCT Filed: Aug. 12, 2011

(86) PCT No.: PCT/EP2011/063941
§ 371 (c)(1),
(2), (4) Date: Mar. 11, 2013

(87) PCT Pub. No.: WO2012/034796
PCT Pub. Date: Mar. 22, 2012

(65) Prior Publication Data
US 2013/0250460 A1 Sep. 26, 2013

(30) Foreign Application Priority Data
Sep. 15, 2010 (DE) .................. 10 2010 040 833

(51) Int. Cl.
*H02H 9/00* (2006.01)
*G01F 15/06* (2006.01)
*G01F 23/00* (2006.01)
*G01F 23/284* (2006.01)

(52) U.S. Cl.
CPC .............. *H02H 9/008* (2013.01); *G01F 15/06* (2013.01); *G01F 23/0061* (2013.01); *G01F 23/284* (2013.01)

(58) Field of Classification Search
CPC .. H02H 9/008; G01F 23/284; G01F 23/0061
USPC ............................................. 361/54
See application file for complete search history.

(56) References Cited

U.S. PATENT DOCUMENTS

| | | | |
|---|---|---|---|
| 4,438,473 A | 3/1984 | Cawley | |
| 5,144,517 A * | 9/1992 | Wieth | ............................ 361/55 |
| 5,982,594 A | 11/1999 | Huczko | |
| 6,014,100 A | 1/2000 | Fehrenbach | |
| 6,021,051 A | 2/2000 | Laskai | |

(Continued)

FOREIGN PATENT DOCUMENTS

| | | |
|---|---|---|
| DE | 2821404 | 10/1979 |
| DE | 10328532 B3 | 12/2004 |

(Continued)

OTHER PUBLICATIONS

German Search Report, German Patent Office, Munich, Jun. 6, 2011.

(Continued)

*Primary Examiner* — Scott Bauer
*Assistant Examiner* — Lucy Thomas
(74) *Attorney, Agent, or Firm* — Bacon & Thomas, PLLC

(57) ABSTRACT

A time triggered crowbar, which is so embodied that it monitors the on-time of at least one downstream electronic component and the period of clocking and therewith the power supply in such a manner that a predetermined maximum allowable surface temperature of the at least one downstream component is not exceeded in the explosion endangered area.

10 Claims, 3 Drawing Sheets

(56) References Cited

U.S. PATENT DOCUMENTS

| | | |
|---|---|---|
| 6,275,391 B1 | 8/2001 | Laskai |
| 6,670,791 B1 | 12/2003 | Smith |
| 2005/0068710 A1 | 3/2005 | Burr |
| 2006/0001567 A1 | 1/2006 | Nilsson |
| 2009/0262473 A1* | 10/2009 | Weinert .......... H02H 9/008 361/56 |

FOREIGN PATENT DOCUMENTS

| | | | |
|---|---|---|---|
| EP | 1503259 | A2 | 2/2005 |
| WO | 2006003445 | A1 | 1/2006 |
| WO | 2006130087 | A2 | 12/2006 |
| WO | 2007043951 | A1 | 4/2007 |
| WO | 2009088349 | A1 | 7/2009 |

OTHER PUBLICATIONS

International Search Report, EPO, The Netherlands, Jun. 1, 2012.

English translation of IPR, WIPO, Geneva, Mar. 28, 2013.

* cited by examiner $$P_{AV} = P_{max} \frac{On - Time}{Period} + P^0$$

ELECTRICAL OR ELECTRONIC SAFETY CIRCUIT

TECHNICAL FIELD

The invention relates to an electrical or electronic safety circuit, which is connected via at least one supply line with at least one component connected downstream in an explosion endangered area and protects such by monitoring the power supplied via the supply line as a function of the ignition protection type required in the explosion endangered area, wherein the at least one downstream component is operated by clocking in such a manner that its on-time is less than the period of the clocking.

BACKGROUND DISCUSSION

Especially in the field of automation technology, both of factory—as well as also process automation technology, the ignition protection type of a device installed in an explosion endangered area plays an important role. The ignition protection type should exclude the risk that in an explosive, or explosion endangered, atmosphere an ignition source occurs, which can trigger an explosion. Ignition protection types used in measuring- and automation technology either block the explosive atmosphere, e.g. by shielding the device by encapsulation or a potting compound, or eliminate ignition sources.

An extremely important ignition protection type in automation technology, especially in the chemical and petrochemical industry, is the ignition protection type Ex i. Devices with ignition protection type Ex i are built to be intrinsically safe, i.e. by special principles of construction, it is assured that, even upon the occurrence of a defect, there is no danger of an explosion in an explosive atmosphere. In intrinsically safe devices, the supplied electrical current and the applied voltage and therewith, the supplied power, are sized sufficiently small that a spark formation, in the case of a switching or in the case of a short circuit, is not sufficient for igniting the explosive atmosphere. The advantages of intrinsically safe devices include that complex housing constructions become unnecessary and maintenance tasks can be performed even during ongoing operating.

It is a special feature of ignition protection type Ex i that, in such case, the Ex protection is, as a rule, implemented outside of the Ex region. Especially, the lines leading into the Ex region are made safe by so-called Ex barriers. The Ex barriers limit electrical current and voltage and are so dimensioned that the electrical circuit is not capable of igniting an explosive atmosphere and the downstream components to be made safe are supplied only with a suitably limited power.

In the case of intrinsically safe devices, it must, moreover, be assured that the surface temperature of the components coming in contact with the explosive atmosphere is limited to predetermined maximum values. For electronics, this means that the surface temperature of the individual components, or, when the electronics is potted, the surface temperature of the potted electronics, has to be limited. In order to satisfy this requirement, it has long been the practice to limit the power of individual components, or also of individual regions, into which a number of components can be combined. Moreover, adjoining components or regions are spaced from one another, wherein the separation between the components and/or regions is dimensioned such that mutual influencing is prevented. The limiting of surface temperature is assured by appropriately sized upstream- or limiting resistors.

The above described manner of limiting surface temperature has, in principle, the disadvantage that the power of individual components or regions must be strongly limited as a function of the upstream- or limiting resistors. Therefore, it is not possible in the case of ignition protection type Ex i to operate components with large upstream- or limiting resistors when the components need the high power.

In the case of known solutions, the same problem is present, when the intrinsically safe device, especially, thus, a field device, is operated in a clocked manner. Clocking means, in this connection, that the on-time is less than the period of the clocking. In the case of a component operated with clocking, an option is to take into consideration the average power consumption of the device for calculating the surface temperature. The average power $P_{AV}$ is calculated with the formula, $$P_{AV} = P_{max} \times (\text{on-time/period}) + P^*$$

and is therewith regulatable via the ratio of on-time to period. In the formula, $P^*$ designates the sum of powers, which are transmitted via further connecting lines, such as signal-, control- and communication lines. The corresponding situation is illustrated in FIGS. 2a and 2b. In practice, the clocking thus provides the opportunity also to transmit very high amounts of energy into the Ex region, when the ratio of on-time and period is correspondingly limited.

SUMMARY OF THE INVENTION

An object of the invention is to provide an electrical or electronic safety circuit, which assures a correct transmission of power in an explosion endangered area.

The object is achieved by features wherein the electrical or electronic safety circuit includes at least one, time triggered crowbar, or time triggered, short circuit switch, wherein the crowbar is so embodied that it monitors the on-time of the at least one downstream electronic component and the period of the clocking and therewith the power supply in such a manner that a predetermined maximum allowable surface temperature of the at least one downstream component in the explosion endangered area is not exceeded.

According to the invention, a safety monitoring of predetermined on-time to predetermined clocking period of the downstream, clocked component thus occurs. Used for this is a time triggered crowbar.

Since, according to the solution of the invention, a voltage- and electrical current monitoring for a controlled power supply into the explosion endangered area is no longer performed, but, instead, since, according to the invention, the maintaining of a predetermined maximum on-time, respectively a predetermined minimum period, is monitored, an option is to transmit an increased power into the explosion endangered area for just a short time. Since the crowbar monitors the maintaining of both time periods, the danger is excluded that, in the case of defect, a maximum surface temperature of the monitored downstream component might be exceeded. Especially advantageous in this connection is when the downstream component reacts relatively slowly to, or with, a temperature jump, i.e. the downstream component has a relatively high thermal inertia. In this way, it is assured that a short time increased power transmission in the explosion endangered area is possible, without exceeding the maximum allowable surface temperature. A graph of surface temperature associated with the power supply is shown in FIG. 2c.

An advantage of the solution of the invention is that a short time increased power supply into the explosion endangered area can occur. A "short time" means, in such case, that the ratio of on-time and period is so dimensioned that the maximum allowable surface temperature of the downstream component is not exceeded. The maintaining of on-time and period is assured via the time triggered crowbar. Thus, for example, the subsequently still to be described in greater detail, microwaves fill level measuring devices require short time powers of 1 watt for operation. With time monitored, clocked supplying of power, these high powers can also be provided in explosion endangered areas. In the case of field devices, which require less operating energy, the solution of the invention makes it possible to increase the measuring rate and, therewith, the accuracy of measurement. Furthermore, the higher the thermal inertia of the downstream component—with or without potting compound—, the higher the pulsed power supply can be.

The following requirements are to be noted as regards the invention:
a) The thermal inertia of the downstream component or of the downstream region must be ascertained by suitable temperature measurements in a type test. In such case, on the one hand, the surface temperature of the downstream component, or of the downstream region, is permitted to increase only slightly during the on-time; on the other hand, the maximum allowable surface temperature of the downstream component, or of the downstream region, must not be exceeded.
b) The monitoring of on-time and period is assured by at least one, time triggered crowbar, or a time triggered, short circuit switch. According to the invention, it is assured that, even in the case of occurrence of a defect in the clocking, e.g. caused by the microprocessor, the allowed surface temperature is not exceeded.

in an advantageous embodiment of the invention, an external control unit is provided, which controls the power supplied via the at least one supply line and monitored by the at least one, time triggered crowbar in such a manner that the on-time of the downstream component is maximum, while the period is minimum. In such case, the time triggered crowbar is not active, so that the power supply is not turned off. Only in the case of defect, when the maximum allowed on-time is exceeded, does the crowbar effect a short circuit and so prevent the supply of an explosion-causing power into the explosion endangered region. The crowbar can be embodied to be either reversible or irreversible. An advantageous embodiment provides that the occurrence of a defect is registered by the control unit. Thereupon, an error report is generated, which e.g. is displayed to operating personnel.

Especially, the crowbar is a safety circuit, which is so designed, that it serves for limiting an intrinsically safe electrical current circuit of the highest ignition protection type, e.g. the ignition protection type Ex ia.

In connection with the above discussion, it is, moreover, advantageous when, or necessary that, the crowbar is embodied multiply redundantly, wherein the number of redundant crowbars per supply line is selected as a function of the ignition protection type holding for the explosion endangered area. In the case of high safety requirements, usually a triple redundance is provided per line to be protected.

An advantageous embodiment of the safety circuit of the invention, respectively the time triggered crowbar of the invention, provides that the crowbar includes a transistor or a thyristor, which possesses the property that it has low resistance between drain and source in the case of a voltage of zero between gate and source. Therewith, the power consumption of the crowbar is very small, except for the case of defect. It is especially important that the circuit can assume the safe state even in the case of low operating voltage.

An advantageous embodiment of the solution of the invention provides that the monitored downstream component, or the monitored downstream components, is/are associated with a field device for determining and/or monitoring a physical or chemical process variable. Serving for registering process variables are sensors, such as, for example, fill level measuring devices, flow measuring devices, pressure- and temperature measuring devices, pH-redox potential measuring devices, conductivity measuring devices, etc., which register the corresponding process variables, fill level, flow, pressure, temperature, pH-value, and conductivity. Serving for influencing process variables are actuators, such as, for example, valves or pumps, via which the flow of a liquid in a section of pipeline or the fill level in a container can be changed. Referred to as field devices are, in principle, all devices, which are applied near to the work in a factory- or process installation and deliver, or process, process relevant information. In connection with the invention, field devices thus include especially also remote I/Os, radio adapters, or, generally, devices, which are arranged at the field level. A large number of such field devices are produced and available from the firm, Endress+Hauser.

The solution of the invention is, moreover, also well suited for making the power supply safe in an explosion endangered area in the case of fully digital, mobile radio communication. To be mentioned expressly in this connection is the frequently applied standard GSM—Global System for Mobile communications. Of course, the invention can be applied generally whenever a clocked operation of a component is present in an explosion endangered area.

Especially advantageous is the solution of the invention in combination with a microwave radar measuring device. Known fill level measuring devices of this type work according to a travel-time method. Travel-time methods utilize the physical law, according to which traveled distance equals the product of travel time and propagation velocity. In the case of fill level measurement, the traveled distance corresponds to twice the separation between antenna and surface of the fill substance. The wanted echo signal, thus the signal reflected on the surface of the fill substance, and its travel time, are determined based on the so-called echo function, respectively the digitized envelope curve, wherein the envelope curve represents amplitudes of the echo signals as a function of separation between the antenna and the surface of the fill substance. The fill level is determined then from the difference between the known separation of the antenna from the floor of the container and the separation of the surface of the fill substance from the antenna determined by the measuring.

All known methods can be applied, which enable relatively short distances to be determined by means of reflected measuring signals. If the measurement signals involve microwaves, then both pulse radar as well as also frequency modulated continuous wave radar (FMCW radar) can be used. Microwave measuring devices, which use pulse radar, are available from the assignee, for example, under the mark MICROPILOT. A device type, which works with ultrasonic signals, is available from the assignee, for example, under the mark PROSONIC. FIG. 1 shows a fill-level measuring device in use.

A further development of the solution of the invention provides that the microwave radar measuring device has an antenna unit, a high frequency module and a sensor electronics, wherein the high frequency module produces the high-frequency measuring signals, wherein the high-frequency measuring signals are transmitted via the antenna unit, respectively the high-frequency measuring signals reflected on the surface of the fill substance are received by the antenna, and wherein the sensor electronics ascertains the fill level of the fill substance in the container based on the travel-time difference between the transmitted and the received high-frequency measurement signals.

In such case, the sensor electronics and the high frequency module are spaced from one another, wherein the energy transmission from the sensor electronics to the high frequency module occurs via the at least one supply line. The communication data between the sensor electronics and the high frequency module are transmitted via at least one signal line. In such case, the sensor electronics is embodied for intrinsic safety.

An advantageous embodiment of the fill level measuring device of the invention provides that the at least one supply line is made safe via at least one controlled crowbar, or via at least one controlled short circuit switch, while the other signal lines present and, in given cases, other transmission lines are limited as regards a maximum supplied power via resistors placed in the signal- and transmission lines. In such case, it is to be assured that the maximum allowed, average power supplied into the explosion endangered area is so dimensioned that the criteria for the predetermined ignition protection type are fulfilled.

BRIEF DESCRIPTION OF THE DRAWINGS

The invention will now be explained in greater detail based on the appended drawing, the figures of which show as follows:

FIG. 2b is a graph of power corresponding to the graph of operating voltage of FIG. 2a;

DETAILED DISCUSSION IN CONJUNCTION WITH THE DRAWINGS

Figure 1:
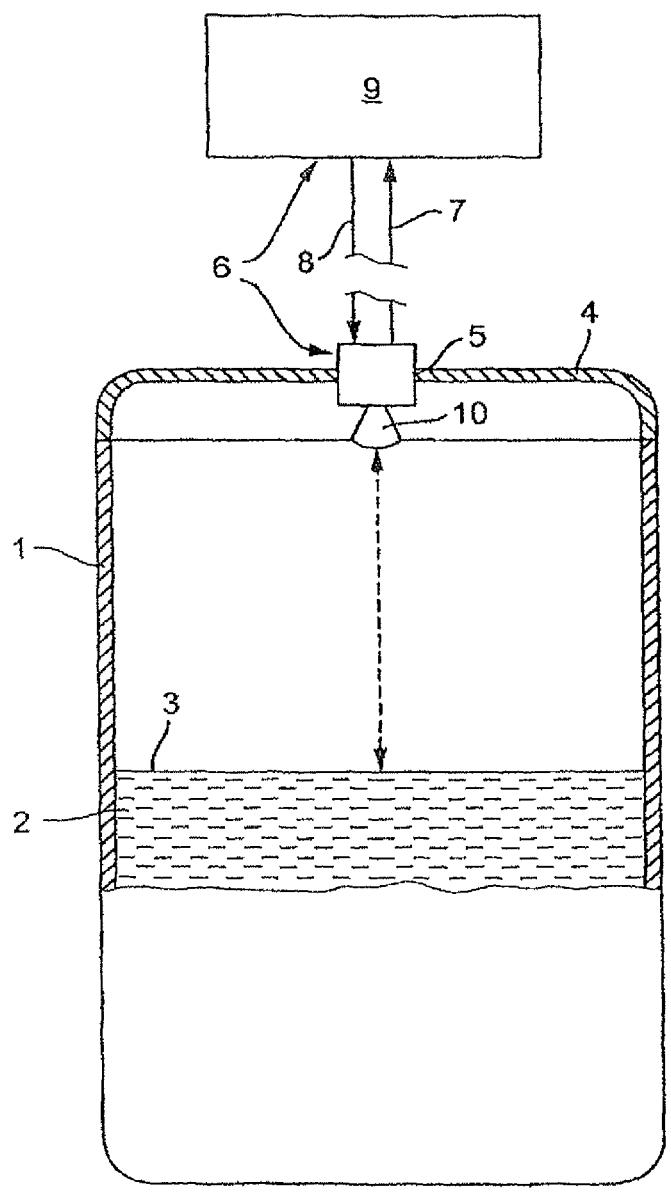
FIG. 1 is a schematic representation of a fill-level measuring device.

FIG. 1 shows a schematic representation of a fill-level measuring device 6, in the case of which the solution of the invention is preferably applied. Stored in the container 1 is a fill substance 2. The fill level 3 of the fill substance 2 in the container 1 is ascertained by means of the fill-level measuring device 6 using a travel-time method. In the illustrated case, the antenna unit 10 with signal production-, transmitting- and receiving unit is spatially separated from the control/evaluation unit 9. Data exchange and electrical current supply between the high frequency module 12 producing the signals, on the one hand, and the sensor electronics 9, on the other hand, occurs via the connecting lines 7, 8. Of course, with regard to the present invention, also a compact device can be applied as fill-level measuring device 6.

Antenna unit 10 is mounted in the opening 5 in the lid 4 of the container 1. Via the antenna unit 10, measuring signals Tx, especially microwaves, are radiated in the direction of the surface normals of the fill substance 2. The reflected echo signals Rx are received in the antenna unit 10. Based on the travel time of the measuring signals Tx/echo signals Rx, the control/evaluation unit 9 ascertains, among other things, the current fill level of the fill substance 2 in the container 1.

Figure 2A:
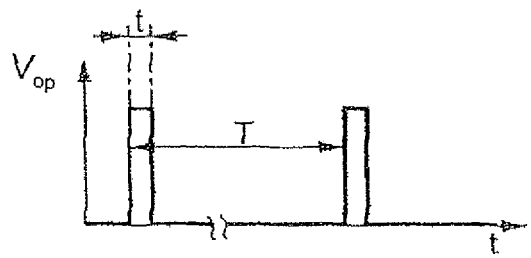
FIG. 2a is a graph of the operating voltage on the supply lines 8 of FIG. 3.
Figure 2B:
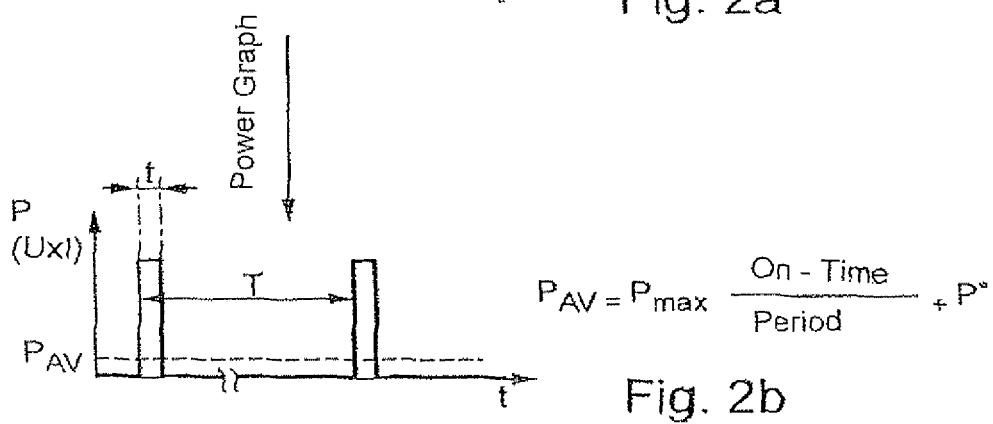
Figure 3:
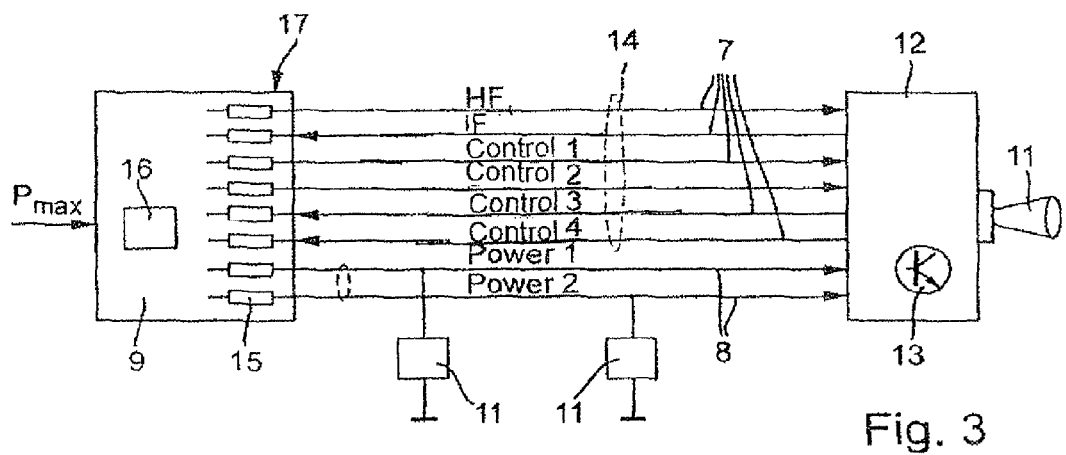
FIG. 3 is a schematic representation of the safety circuit, wherein each supply line has its own time triggered crowbar of the invention.

FIG. 2a shows a graph of clocked operating voltage Vop on the supply lines 8 of FIG. 3. The graph shows that the on-time t is only a fraction of the period T. The graph of FIG. 2b shows that the power $P_{AV}$ corresponding to the operating voltage of FIG. 2a amounts to:

$$P_{AV}=P_{max} \cdot (\text{on-time } t/\text{period } T)+P^*$$

In such case, P* corresponds to the sum of the powers, which are transmitted via the signal-, control- and communication lines 7. This subject matter is illustrated in FIGS. 2a and 2b.

Figure 2C:
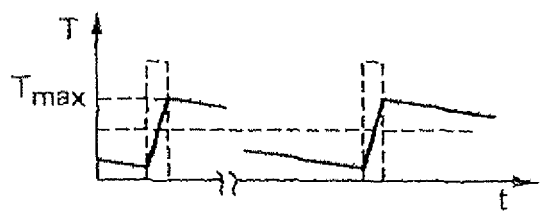
FIG. 2c is a typical graph of surface temperature of the component 13 shown in FIG. 3.

FIG. 2c is a graph of surface temperature T of the component 12 of FIG. 3. $T_{max}$ stands, in such case, for the maximum allowable surface temperature of the component 12 in the explosion endangered region. The dashed line presents the average surface temperature, which is caused by the average allowable power $P_{AV}$. Taken into consideration for the maximum allowable surface temperature of the component 14 is the maximum allowable electrical power $P_{AV}$ and the maximum on-time t and the minimum period T monitored by the crowbar 11. The crowbar 11 assures the maintaining of the predetermined maximum on-time t, respectively the minimum period T. In case the control unit associated with the sensor electronics 9 defectively makes the on-time t too long, or the period T too short, the time triggered crowbar 11, by a short circuit, prevents exceeding of the average allowable power $P_{AV}$, respectively the allowed surface temperature $T_{max}$, in the explosion endangered area.

FIG. 3 shows a schematic representation of the power limiting, wherein each supply line 8 is provided with a time triggered crowbar 11 of the invention. The sensor electronics 9 is supplied with a limited power $P_{max}$. The power limiting is implemented via corresponding resistances in the clamping module or in an upstream-connected electronics (not shown in FIG. 3). The intrinsic safety of the interface 17 is assured via the resistors 15 of the interface 17. Besides the supply lines 8, six other lines 7 are provided between the sensor electronics 9 and the HF module 12. The two upper lines 7 serve, respectively, for transmission of the high-frequency signal HF and the intermediate signal IF. The four additional lines 7 are control lines. The resistors 15 have high resistance corresponding to the intrinsic safety.

The crowbars 11 connected to the two supply lines 8 monitor energy supply as a function of time. The clocking, i.e. the ratio of on-time t to period T, is predetermined by the control unit 9. The control unit 9 is intelligent, usually on the basis of a microprocessor 16. The crowbars 11 monitor that the predetermined ratio of on-time t to period T is maintained. If there is a malfunction, and the microprocessor 16 makes the on-time t too long or the period T too short, then the corresponding time triggered crowbar 11 short circuits the supply line 8. The short circuit completely interrupts supply of power into the explosion endangered area. The interruption by the crowbar 11 can be reversible or irreversible.

Figure 4:
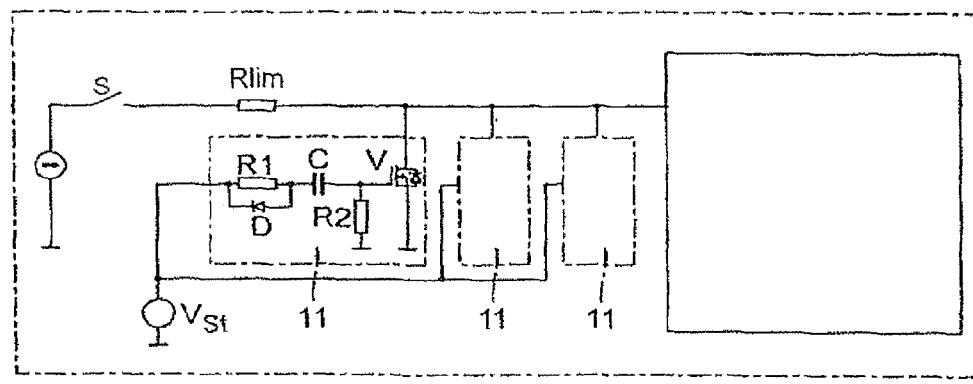
FIG. 4 is a block diagram of a time triggered crowbar of the invention.

FIG. 4 shows the operation of a time triggered crowbar 11 of the invention in the supply line 8. The energy transmission is from an explosion endangered area C4 into an explosion endangered area C6. Via the control (steering) voltage VSt—which is, in the illustrated case, a rectangular voltage—directly before the closing of the switch S, the crowbar 11 is, for the duration of the on-time t of the downstream components 12, switched to high resistance mode. The maximum power, which is transmitted into the region C6, is calculated with a limiting resistor Rlim=5 ohm, an on-time of t=2 ms and a period T=200 by means of following formula to be 22.5 mW.

$$P_{ExC6} = \frac{1}{2} \cdot \frac{U_{ExC4}^2}{2 \cdot R\lim} \cdot t/T$$

With a limiting resistor of 5 ohm, without the limiting of the on-time, it would have been possible to send into the explosion endangered region C6 only 2.25 mW. By means of the solution of the invention, it is, consequently, possible to send significantly increased power into the explosion endangered area.

Under the boundary conditions, that the components—with or without potting compound—have a sufficiently high thermal inertia and that the on-time t to period T is safety monitored via a crowbar 11, it is possible, according to the invention, to supply a high power to components for a short time, without exceeding the maximum allowable surface temperature.

The functioning of the crowbar 11 will now be described in more detail. The transistor A in the illustrated case is an N-channel depletion MOSFET. Depletion MOSFETs have the property that, for the case, in which the connection between gate G and source S is at zero volts, the path between drain D and source S is low resistance. With this property, it is assured that the crowbar 11 will always maintain the safe state down to the smallest operating voltages.

So long as the crowbar 11 is in the low-ohm state, the control voltage Vst is in the HIGH-state and the capacitor C charges via the resistances R1 and R2 to the HIGH-voltage. In order, for the duration t of the on-time, to change into the high-resistance state, the control voltage Vst is switched to zero, or LOW (=0 V). On the gate G of the transistor A, there is then placed via the diode D on the capacitor C a negative voltage of size equal to the HIGH-voltage minus the threshold voltage of the diode D. The transistor A enters the high-resistance state, and, indeed, until either the control voltage Vst changes back into the HIGH-state, or until the capacitor C discharges via the resistor R2 below the threshold voltage of the transistor A. This state corresponds to a safe state for the case in which the on-time t permitted by the control unit 16 exceeds the maximum allowed on-time. Since the resistor R1 is significantly larger than the resistor R2, it limits the charging of the capacitor C and so prevents a too short period T. Thus, it is also assured that the crowbar 11 responds when the period T permitted by the control unit subceeds, or falls beneath, the predetermined period T.

In order to assure that the safety demands placed on the safety circuit also still hold when the crowbar 11 shown in detail in FIG. 4 is lost, crowbar 11 is redundantly provided. In the illustrated case, the safety via the crowbar 11 is triply redundantly provided.

The invention claimed is:

1. An electrical or electronic safety circuit, which is connected via at least one supply line with at least one component connected downstream in an explosion endangered area, the electrical or electronic safety circuit protects the at least one downstream component by monitoring the power supplied via the supply line as a function of the ignition protection type required in the explosion endangered area, wherein the at least one downstream component is operated by clocking in such a manner that its on-time is less than the period of the clocking, the electrical or electronic safety circuit includes:
   at least one, time triggered crowbar, or time triggered, short circuit switch, said crowbar being so embodied that it monitors the on-time of the at least one downstream electronic component and the period of the clocking and therewith the power supply in such a manner that a predetermined maximum allowable surface temperature of the at least one downstream component in the explosion endangered area is not exceeded;
   wherein an external control unit is provided, which controls the power supplied via the at least one supply line transferred and monitored by said at least one, time triggered crowbar in such a manner that the on-time of the downstream component is maximum, while the period is minimum, without said time triggered crowbar becoming active and turning the power supply off.

2. The electrical or electronic safety circuit as claimed in claim 1, wherein:
   said crowbar is a safety circuit, which serves for limiting an intrinsically safe electrical current circuit of the highest ignition protection type, such as the ignition protection type Ex ia.

3. The electrical or electronic safety circuit as claimed in claim 1, wherein:
   said crowbar is embodied multiply redundantly; and
   the number the redundant crowbars is selected as a function of the ignition protection type holding for the explosion endangered region.

4. The electrical or electronic safety circuit as claimed in claim 1, wherein:
   said crowbar includes a transistor or a thyristor, which possesses the property that it has low resistance between drain and source in the case of a voltage of zero between gate and source.

5. The electrical or electronic safety circuit as claimed in claim 1, wherein:
   the monitored downstream component, or the downstream monitored components, is/are associated with a field device for determining and/or monitoring a physical or chemical, process variable.

6. The electrical or electronic safety circuit as claimed in claim 5, wherein:
   the field device is a microwave radar measuring device, which ascertains the fill level of a fill substance in a container via a travel-time method.

7. The electrical or electronic safety circuit as claimed in claim 6, wherein:
   said microwave radar measuring device includes an antenna unit, a high frequency module and sensor electronics;
   said the high frequency module produces the high-frequency measuring signals, the high-frequency measuring signals are transmitted via said antenna unit, respectively the high-frequency measuring signals reflected on the surface of the fill substance are received by said antenna; and said sensor electronics ascertains the fill level of the fill substance in the container based on the travel-time difference between the transmitted and the received high-frequency measurement signals.

8. The electrical or electronic safety circuit as claimed in claim 7, wherein:

said sensor electronics and said high frequency module are spaced from one another;

the energy transmission from said sensor electronics to said high frequency module occurs via the at least one supply line, and communication data between said sensor electronics and said high frequency module are transmitted via at least one signal line.

9. The electrical or electronic safety circuit as claimed in claim 7, wherein said sensor electronics is embodied to be intrinsically safe.

10. The electrical or electronic safety circuit as claimed in claim 1, wherein;

the at least one supply line is made safe via said at least one controlled crowbar, or via at least one controlled short circuit switch;

signal lines present and, in given cases, other transmission lines are limited as regards maximum supplying power via resistors placed in the signal- and transmission lines; and the maximum power supply into the explosion endangered area is so dimensioned that the criteria for the predetermined ignition protection type are fulfilled.

* * * * *